(12) United States Patent
Fukuda et al.

(10) Patent No.: US 8,534,275 B2
(45) Date of Patent: Sep. 17, 2013

(54) WIRE SAW DEVICE

(75) Inventors: Masaki Fukuda, Tokyo (JP); Hiroyasu Futamura, Tokyo (JP); Ryouji Shindou, Tokyo (JP)

(73) Assignee: Sumco Corporation, Tokyo (JP)

( * ) Notice: Subject to any disclaimer, the term of this patent is extended or adjusted under 35 U.S.C. 154(b) by 461 days.

(21) Appl. No.: 12/855,865

(22) Filed: Aug. 13, 2010

(65) Prior Publication Data

US 2011/0048396 A1 Mar. 3, 2011

(30) Foreign Application Priority Data

Aug. 31, 2009 (JP) ................................. 2009-199270

(51) Int. Cl.
*B28D 1/06* (2006.01)

(52) U.S. Cl.
USPC ........................................ 125/16.02; 125/21

(58) Field of Classification Search
USPC ..................................... 125/21, 16.02; 451/7
See application file for complete search history.

(56) References Cited

U.S. PATENT DOCUMENTS

| | | | |
|---|---|---|---|
| 8,167,681 B2 | 5/2012 | Oishi et al. | |
| 8,267,742 B2 | 9/2012 | Kitagawa | |
| 2006/0025051 A1* | 2/2006 | Noguchi et al. | 125/21 |
| 2010/0206285 A1* | 8/2010 | Kitagawa | 125/16.02 |
| 2011/0126813 A1* | 6/2011 | Hodsden et al. | 125/16.02 |

FOREIGN PATENT DOCUMENTS

| | | |
|---|---|---|
| JP | 09-262826 A | 10/1997 |
| JP | 2007-273711 A | 10/2007 |
| JP | 2008078473 A | 4/2008 |
| JP | 2008-302618 A | 12/2008 |
| JP | 2009-113173 A | 5/2009 |

* cited by examiner

*Primary Examiner* — Maurina Rachuba
(74) *Attorney, Agent, or Firm* — Thomas J. Engellenner; Reza Mollaaghababa; Pepper Hamilton LLP (57) ABSTRACT

An object of the present invention is to provide at a relatively cheap price a wire saw device capable of effectively preventing slurry from splashing onto the top surface of a work and effectively suppressing increase in nanotopography and Warp. The wire saw device 1 of the present invention has: a group of multiple wires 4 formed by suspending a wire 3 over a set of rollers 2, 2, 2 separate from each other so as to be aligned in a cutting side thereof in parallel to one another in the roller shaft direction X and capable of running in a direction orthogonal to the roller shaft direction; a work holding portion 5 for holding a work W and moving the work W in a direction of pushing the work W with respect to the group of multiple wires 4; and a nozzle 6 for supplying slurry to the group of multiple wires 4 from at least a position on the upperstream side in the running direction of the multiple wires 4, with respect to a path along which the work W is pushed into the wire 3. Further, the wire saw device 1 is provided with a slurry blocking plate 7, extending in the direction along which the multiple wires 4 are aligned in parallel to one another, and pivotably fixed at a base point located at least on the side at which the nozzle 6 is provided and above the multiple wires 4, such that the slurry blocking plate 7 falls, around the base point, on the work W in the direction of pushing the work W with respect to the multiple wires 4.

9 Claims, 7 Drawing Sheets

TOP     CENTER     BOTTOM (B)

WIRE SAW DEVICE

BACKGROUND OF THE INVENTION

1. Field of the Invention

The present invention relates to a wire saw device for cutting out a number of wafers from a silicon ingot, an ingot of a compound semiconductor material, or the like, and particularly to a wire saw device having a structure which allows wafer cut out from an ingot to maintain high quality.

2. Description of the Related Art

A wafer for use in a semiconductor substrate is produced by slicing a material such as a silicon ingot or an ingot of a compound semiconductor material. As a result of recent increase in size of such an ingot, the conventional cutting process of an ingot by an inner-diameter blade slicer has been increasingly replaced with a method of producing a large number of wafers by simultaneous slicing process using a wire saw device. A piece of a material, including such an ingot as described above, which is subjected to a cutting process by a wire saw, is generally referred to a "work".

A wire saw device is a device, as disclosed in JP 09-262826 Laid-Open, for causing wires wound around rollers to run at a relatively high speed, injecting slurry from a nozzle to apply the slurry onto the wires and pressing the wires on a work in such a state as this, thereby cutting the work to simultaneously cut out a number of wafers.

A schematic structure of a standard wire saw device will be described hereinafter. A wire saw device mainly includes wires for cutting a work, plural rollers on which the wires are suspended such that the wires can be caused to run, a mechanism for imparting tension to the wires, a work holding portion for feeding the work downward, and a mechanism for supplying slurry to the wires during the wire cutting process. The wires are unwound from one wire reel and fed to the rollers via a traverser and a tension-imparting means such as a powder clutch, a dancer roller and the like. The wires constitute a group of multiple wires aligned in the roller axial direction and suspended over the plural rollers by being spirally wound over the rollers totally 300 to 400 times. Each roller is produced by injecting polyurethane resin to a peripheral portion around a steel cylinder and forming grooves on the resin surface at a constant pitch. The wound wires, driven by a driving motor, can make reciprocal movements in a predetermined period.

When a work is to be cut, the work holding means holding the work is moved toward the multiple wires and the work is pushed into the multiple wires running at a pre-programmed feeding speed. A nozzles is provided in the vicinity of the multiple wires so that slurry containing grinding particles and a dispersant can be supplied to the multiple wires from a slurry tank at the time of cutting. Further, a slurry chiller is connected to the slurry tank so that the temperature of slurry to be supplied can be adjusted. An ingot is sliced by using such a wire saw device as described above, specifically, by imparting appropriate tension to the wires by using the wire tension imparting means and causing the multiple wires, driven by the driving motor, to make reciprocal movements.

However, there is a problem in such a wire saw device as described above, in that slurry supplied to the wires changes the temperature of the ingot when the ingot is cut by the wires, whereby waviness components on a wafer surface increases and the quality of the obtained wafers deteriorates. Examples of the surface waviness components include nanotopography of projection-recess components in the range of 0.2 to several dozen mm, "Warp" as the maximum magnitude of warpage at a wafer surface, and the like. Among these examples, increase in nanotopography significantly affects the quality of wafers.

The nanotopography as described above represents a surface waviness component having shorter wavelengths than those of Warp and constituted of wavelength components where $\lambda$ is in the range 0.2 to several dozen mm. Nanotopography as described above presumably affects the yield rate of the STI (shallow trench isolation) process in production of a device. Nanotopography is generated during processing steps (from slicing to grinding) of a wafer and nanotopography caused by slicing by a wire saw (i.e. slice waviness) is classified into three types of components: suddenly-generated component; component generated in the cut-starting or the cut-finishing portion of a wafer; and component having periodicity. Among these components, the component generated in the cut-starting or the cut-finishing portion of a wafer is likely to be judged as defective in the numerical judgment of nanotopography. In particular, nanotopography in the cut-finishing portion is generally larger than nanotopography in the cut-starting portion and thus likely to exhibit the worst numerical value of nanotopography in a wafer surface and be regarded as defective in the numerical judgment.

To address the aforementioned problem, JP 2008-078473 Laid-Open discloses a wire saw device in which the temperature of slurry to be supplied is controlled to thereby control change in temperature of an ingot to suppress increase in nanotopography caused by change in temperature of the ingot. In this case, since control of the temperature of slurry is effected only through the control of temperature of slurry supplied from a nozzle, the basic structure of the conventional wire saw device can be used as it is and thus no significant increase in cost is resulted therefrom. Alternatively, JP 2008-302618 Laid-Open discloses, as another solution to address the aforementioned problem, a wire saw device where slurry is divided into two systems, i.e. slurry for cutting and slurry for temperature adjustment, and the temperatures of the respective slurries are independently controlled so that change in temperature of an ingot during the cutting process is further meticulously controlled to more effectively suppress increase in nanotopography caused by change in temperature of the ingot. However, the wire saw device described in JP 2008-302618 needs two nozzles and the temperatures of slurries released from these nozzles have to be controlled, respectively, whereby the device structure is complicated and the device itself is quite expensive.

Further, when an ingot is cut by using such a wire saw device as disclosed in JP 2008-078473 or JP 2008-302618, slurry splashes and attaches to the top surface of an ingot during the cutting of the ingot. The slurry attaching to the top surface of the ingot exhibits increased viscosity due to evaporation of moisture caused by cutting heat and the like. Such slurry having increased viscosity is then supplied to portions of a work which have already been cut by the wires and flows into sites where the cutting operation is being carried out, whereby cutting precision deteriorates. Yet further, since the slurry splashed on the top surface of an ingot is supplied again to the ingot, slurry supply becomes too much, making it difficult to appropriately control the temperature of the ingot and thus increasing nanotopography and Warp, which results in deterioration of wafer quality.

As a means for solving the problems described above, JP 2007-273711 Laid-Open discloses a wire saw device having a catching member for catching slurry which splashes when being supplied from a nozzle. The catching member is fixedly assembled with a work holding portion. The device of JP 2007-273711 has an advantage in that it has the catching member and slurry splashed on the top surface of an ingot is caught, though not perfectly, by the catching member, whereby increase in nanotopography and Warp by slurry as described above is suppressed. Further, the wire saw device of JP 2007-273711 has a relatively simple structure, which does not so significantly increase the production cost.

On the other hand, JP 2009-113173 discloses a wire saw device including a plate- or block-shaped slurry splash preventing member which can move in the horizontal direction or make lateral movement along a circular orbit in accordance with the shape of a work. It has been reported that the wire saw device of JP 2009-113173 can suppress bellow-like movement of a work, which movement is caused when slurry attached to wires hits cut-in portions of the work, splashes and the splashed slurry reflows into the cut-in portions, and that the device therefore can improve the quality of a wafer in terms of Warp.

However, the wire saw device disclosed in JP 2007-273711 has a problem in that the catching member thereof cannot sufficiently catch slurry released from the nozzle and a portion of the slurry splashes on the top surface of the work, whereby nanotopography and Warp increase.

Further, in the case of the slurry splash preventing member of the wire saw device of JP 2009-113173, it is necessary to constantly monitor the relationship between the position of a work and the position of the slurry splash preventing member, to cause the slurry splash preventing member to move horizontally or make lateral movement along a circular orbit in accordance with the shape of the work. In order to cause the slurry splash preventing member to move upwardly with maintaining a state where the slurry splash preventing member is constantly in contact with the work, highly sophisticated control is required and it is difficult to employ such a device structure in actual practice. If the slurry splash preventing member is caused to make excessive lateral movement, the slurry splash preventing member may strike the outer peripheral face of a work and drop the work off the device. Further, as described above, a very expensive device is required to achieve such a precise device structure as enables causing the slurry splash preventing member to move upward with maintaining a state where the slurry splash preventing member is constantly in contact with the work.

In view of these facts, it is therefore necessary to provide a clearance between the work and the slurry splash preventing member in actual practice. However, in such a device structure as this, there is a possibility that slurry released from the nozzle is not completely blocked and a portion of the slurry splashes on the top surface of the work, deteriorating nanotopography and Warp. Specifically, when a portion of slurry splashes onto the top surface of a work, the temperature of the splashing slurry drops due to exposure of the slurry to the air and a portion of the slurry of which temperature has thus dropped splashes on the top surface of the work which has been heated due to the processing heat generated by the cutting operation, whereby a region of the work where the cooled slurry has splashed and the vicinities thereof suffer from rapid decrease in temperature and thermal shrink associated therewith. As a result, nanotopography and Warp deteriorate at the portions of the work which has experienced rapid thermal shrink.

In this regard, there has been a demand for a wire saw device capable of effectively preventing slurry from splashing onto the top surface of a work and also sufficiently suppressing increase in nanotopography and Warp. Further, there has been a demand for providing such a wire saw device as described above at a relatively cheap price.

SUMMARY OF THE INVENTION

Accordingly, an object of the present invention is to provide at a reasonable price a wire saw device capable of effectively preventing slurry from splashing onto the top surface of a work and thus sufficiently suppressing increase in nanotopography and Warp, by improving a slurry splash preventing member thereof.

The primary structure of the present invention is as follows.

(1) A wire saw device having: a group of multiple wires suspended in parallel to one another in a cutting side thereof, over plural rollers disposed separate from each other, so as to be capable of running in a direction orthogonal to the roller shaft direction; a work holding portion for holding a work and capable of moving in a direction of pushing the work with respect to the multiple wires; and a nozzle for supplying slurry to the group of multiple wires from at least a position on the upperstream side in the running direction of the multiple wires, with respect to a path along which the work is pushed into the wires, comprises: a slurry blocking plate, extending in the direction along which the multiple wires are aligned in parallel to one another, and pivotably fixed at a base point at least on the upperstream side in the running direction of the multiple wires with respect to the path and above the multiple wires, such that the slurry blocking plate falls, around the base point, on the work in the direction of pushing the work with respect to the multiple wires. In the present invention, "a path along which the work is pushed into the wires" represents a path along which a work is pushed into wires for the cutting operation of the work.

(2) The wire saw device of (1) above, wherein the slurry blocking plate can be biased toward the path along which the work is pushed into the wires.

(3) The wire saw device of (1) above, further comprising: another nozzle for supplying slurry to the group of multiple wires provided on the downstream side in the running direction of the multiple wires with respect to an operation region where the work is pushed into the wires; and another slurry blocking plate pivotably fixed at a base point above the multiple wires and said another nozzle such that said another slurry blocking plate falls, around the base point, on the work in the direction of pushing the work with respect to the multiple wires.

(4) The wire saw device of (1) above, wherein the length in the roller shaft direction of the slurry blocking plate is equal to or larger than the length in the roller shaft direction of the group of the multiple wires.

(5) The wire saw device of (1) above, wherein the slurry blocking plate is formed by a flexible material.

(6) The wire saw device of (5) above, wherein the flexible material is selected from the group consisting of resin, metal, rubber and combination thereof.

(7) The wire saw device of (1) above, wherein the slurry blocking plate is constituted of plural plate pieces juxtaposed in the roller shaft direction.

(8) The wire saw device of (1) above, wherein an elastic member is provided on a surface of the slurry blocking plate facing the path along which the work is pushed into the wires.

According to the present invention, it is possible to provide a wire saw capable of reliably preventing slurry from splashing onto the top surface of a work and effectively suppressing increase in nanotopography and Warp, by designing the slurry blocking plate to fall on and continuously remain in contact with the work. Further, since such a wire saw device as described above has a relatively simple device structure, it is possible to provide the device at a relatively cheap price.

DESCRIPTION OF THE PREFERRED EMBODIMENTS

Hereinafter, a wire saw device of the present invention will be described in detail with reference to FIG. 1.

Figure 1:
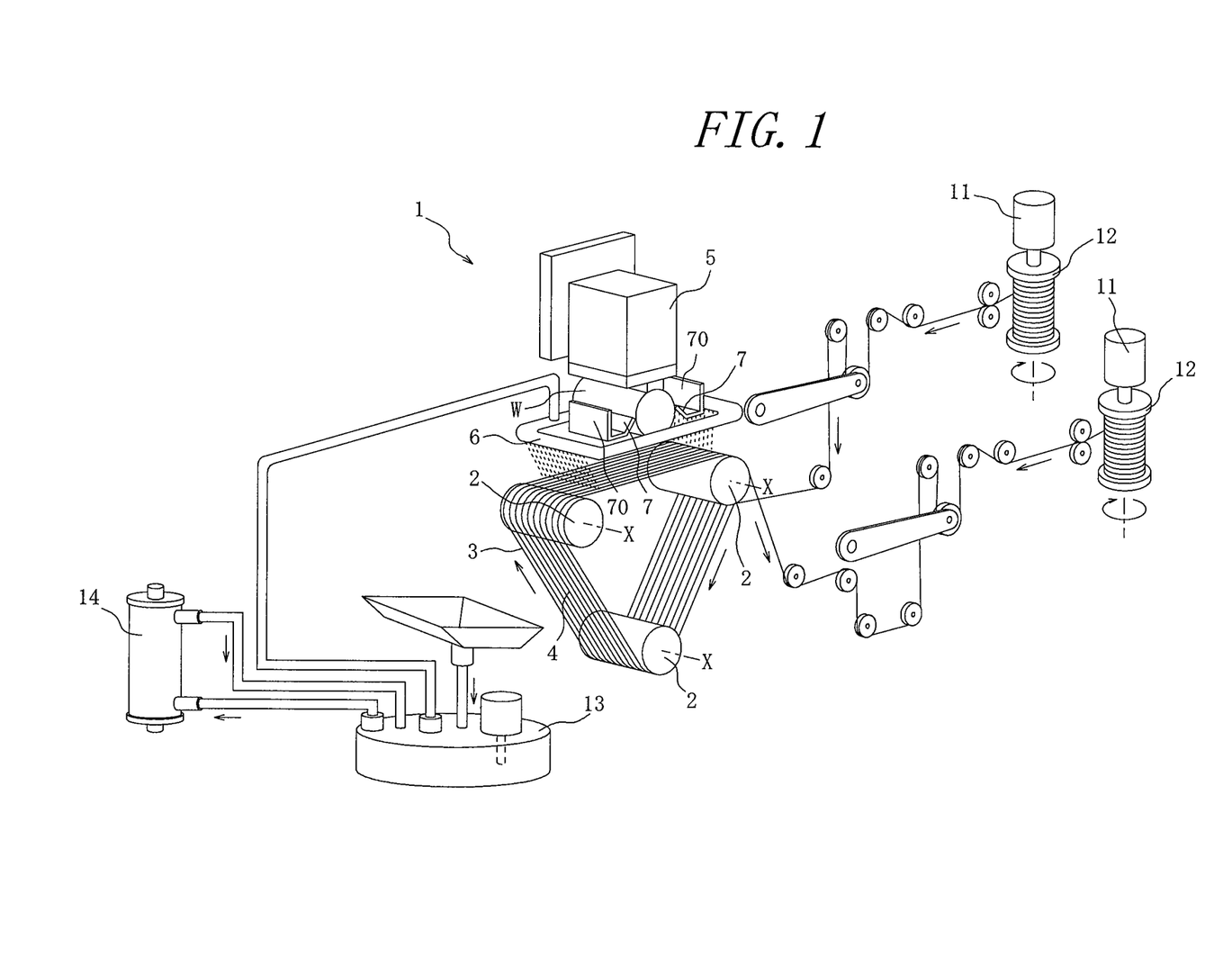
FIG. 1 is a view showing a wire saw device of the present invention.
Figure 2:
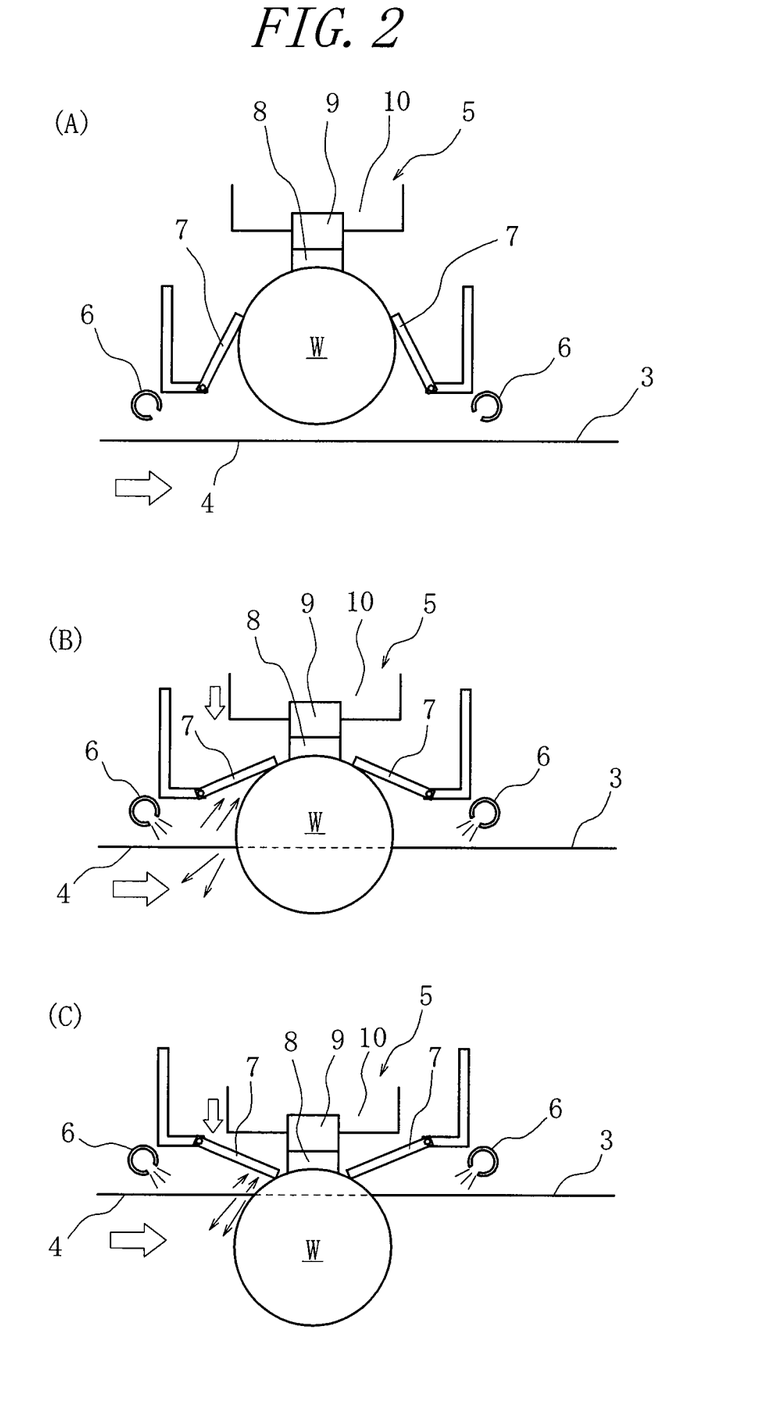
FIGS. 2A to 2C are views showing a process of cutting a work by using the wire saw device of the present invention.

As shown in FIG. 1, a wire saw device 1 of the present invention has: a group of multiple wires 4 formed by repeatedly suspending a wire 3 over a set of rollers 2, 2, 2 separate from each other so as to be aligned in a cutting side thereof in parallel to one another with intervals therebetween in the roller shaft direction X and capable of running in a direction orthogonal to the roller shaft direction; a work holding portion 5 for moving a work W in a direction of pushing the work W with respect to the group of multiple wires 4; and a pair of nozzles 6, 6 for supplying slurry to the group of multiple wires 4 from positions on the upstream side and the downstream side in the running direction of the multiple wires 4, with respect to a path along which the work W is pushed into the wires 4. Further, the wire saw device includes, above the group of multiple wires 4, a slurry blocking plate 7 extending in the direction along which the group of multiple wires 4 are aligned in parallel to one another. The slurry blocking plate 7 is pivotably connected to a slurry blocking plate fixing member 70, such that the slurry blocking plate 7 falls due to its own weight, around a base point at which the slurry blocking plate 7 is connected to the slurry blocking plate fixing member 70, on the work W in the direction of pushing the work W with respect to the multiple wires. In the wire saw device 1 shown in FIG. 1, the nozzles 6 are provided on both the upstream side and the downstream side in the running direction of the multiple wires 4 with respect to the path along which the work W is pushed into the multiple wires 4. However, the present invention is not limited thereto and, although not shown, it is possible to structure the wire saw device such that the nozzle 6 and the slurry blocking plate 7 are provided only on the upstream side of the path. As shown in FIG. 2, the work holding portion 5 is constituted by an abutting plate 8 made of carbon for directly holding the which the work plate 9 is provided. A carbon plate may be used as the abutting plate 8 and the work W is attached to the abutting plate 8 by means of an epoxy adhesive or the like. The work plate 9 is structured by stainless steel or the like and attached to the abutting plate 8 by means of an epoxy adhesive. The wire 3 is wound on a pair of wire reels 12, 12 rotated by corresponding drive motors 11. The wire 3 is reeled out of one of the wire reels 12 driven by the drive motors 11 and caused to run via a traverser and a tension imparting means such as a powder clutch, a dancer roller and the like for imparting tension to the wire 3. The running direction of the wire 3 can be controlled by controlling the rotational directions of the driving motors 11, such that the wire is caused to run in only one direction or make reciprocal running, according to necessity. The group of multiple wires 4 can be made to run at an average velocity of 400 to 900 m/min with tension of 2.0 to 3.0 kgf imparted thereto. The slurry is stored in a slurry tank 13 and fed from the slurry tank 13 to the nozzle 6 via a slurry chiller 14 for adjusting the temperature of the slurry. Hereinafter, a cutting process will be described in detail with reference to FIG. 2.

FIGS. 2A to 2C are views showing a process of cutting a work using the wire saw device of the present invention. First, as shown in FIG. 2A, a work W is fixed on the work holding portion 5 by attaching the work W to the abutting plate 8 by means of an epoxy adhesive, whereby the work W is set in the wire saw device 1. At this stage, the slurry blocking plate 7 falls on the work due to its own weight and is brought into contact with a side of the work. Next, as shown in FIG. 2B, the work holding portion 5 is lowered toward the multiple wires 4 to push the work W into the multiple wires 4, while the multiple wires 4 are caused to run in the direction shown by the white arrow, so that the work W is cut by the wires. Simultaneously with this, slurry is supplied to the wire 3 from the nozzles 6, 6 provided on the upperstream side and the downstream side in the running direction of the multiple wires 4 with respect to the operation region where the work W is being pushed into the multiple wires 4. Further, the slurry blocking plate 7, following the movement of the work W being pushed into the multiple wires 4, falls on the work W due to its own weight, while maintaining a state where the slurry blocking plate 7 is in contact with a side of the work W. Then, the slurry blocking plate 7, following the movement of the work W, continues to fall on the work due to its own weight until the cutting operation of the work W is completed, with maintaining the state in which the slurry blocking plate 7 is in contact with a side of the work W, as shown in FIG. 2C. Accordingly, the slurry blocking plate 7 is constantly in contact with the work W during the cutting process, whereby, when slurry is supplied to the wire 3 and splashed by the wire cutting the work W, the splashed slurry only reaches the position where the slurry blocking plate 7 is abutting the work W and slurry is prevented from splashing up to the top surface of the work W. It is thus possible to suppress excess increase in nanotopography and Warp caused by slurry splashing up to the top surface of the work. In a case where the wire is caused to run not in one direction but in a reciprocal manner and the cut-in side and the cut-out side of the wire 3 are reversed periodically, it is possible to supply slurry always on the cut-in side by providing the nozzles 6 on both of the cut-in and cut-out sides of the wire 3, as shown in FIG. 2. Further, the wire saw device 1 of the present invention can be produced relatively inexpensively because it has a relatively simple device structure and does not require complicated control of the slurry blocking plate 7 by a computer.

Yet further, the slurry blocking plate 7 is preferably biased toward the path along which the work W is pushed into the wires. The contact of the slurry blocking plate 7 with the work W is reliably maintained, even when the pressure of slurry increases, by biasing the slurry blocking plate 7 toward the work W, whereby splash of slurry onto the top surface of the work W is more effectively suppressed. Examples of a means for biasing the slurry blocking plate 7 include an assembly of a mechanical spring, an air cylinder or the like with the slurry blocking plate 7. When the flow rate of slurry during the cutting operation of the work is 150 kg/min, for example, a relatively large slurry pressure with respect to the slurry blocking plate 7 is anticipated. In this case, the pressure at which the slurry blocking plate 7 pushes the work W is preferably equal to or larger than 0.01 kg/cm² in terms of reliably preventing slurry from splashing onto the top surface of the work W.

Further, the length in the roller shaft direction of the slurry blocking plate 7 is preferably not smaller than the length of a portion covered by the wire, of the roller 2, which portion extends in a direction orthogonal to the wire 3 winding direction in a plan view of the rollers 2 having the multiple wires 4 spirally wound thereon. In a case where the length in the roller shaft direction of the slurry blocking plate 7 is smaller than the length of a portion covered by the wire, of the roller 2, which portion extends in a direction orthogonal to the wire 3 winding direction, a portion of slurry supplied from the nozzle 6 may splash onto the top surface of the work during the cutting operation of the work W.

Yet further, the slurry blocking plate 7 is preferably formed by a flexible material. In a case where the slurry blocking plate 7 is formed by an inflexible material, a surface of the work W may suffer from a scratch when the slurry blocking plate 7 is brought into contact with the surface of the work W, whereby the quality of a wafer as a product obtained by the cutting of the work W may deteriorate. Examples of the flexible material include resin such as phenol resin, epoxy resin, melamine resin or the like, rubber such as urethane-based elastomer, natural rubber, polybutadiene rubber, acrylic rubber, silicon rubber or the like, and a combination thereof, combined with metal such as stainless steel. For example, the slurry blocking plate 7 can have a structure in which a plate-shaped acrylic rubber is attached to a plate-shaped stainless steel. In this case, elastic acrylic rubber is preferably provided on a side of the slurry blocking plate 7, which side is to be in contact with the work W, in terms of enhancing adhesion of the slurry blocking plate 7 with the work W to effectively suppress slurry leak and preventing a work surface from being damaged by contact of the slurry blocking plate 7 with the work W. It is possible to employ a structure in which the slurry blocking plate 7 is entirely covered by elastic acrylic rubber.

Figure 3:
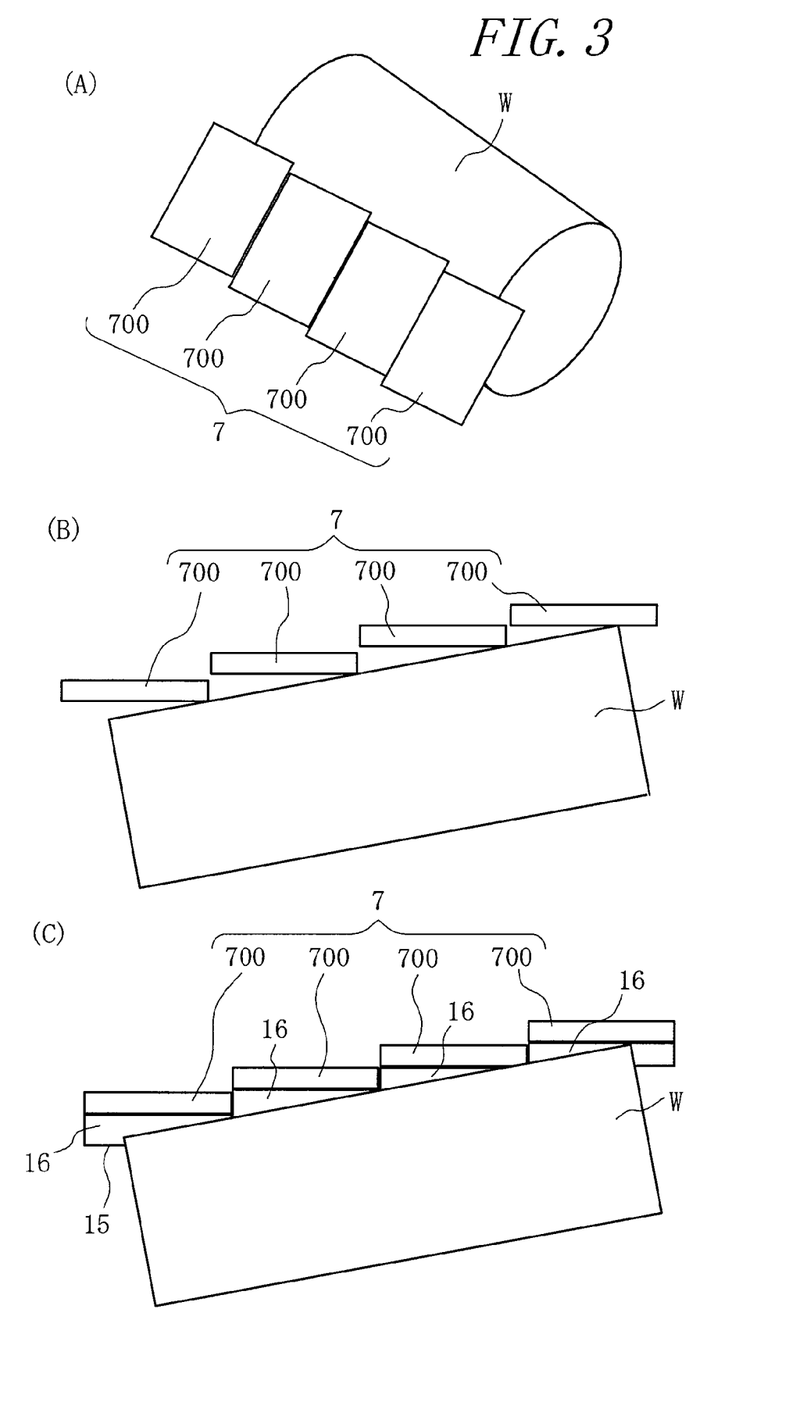
FIGS. 3A to 3C are views showing a slurry blocking plate of a wire saw device of an embodiment of the present invention.

Yet further, the slurry blocking plate 7 is preferably constituted of plural, e.g. four, plate pieces 700 juxtaposed in the roller shaft direction X, as show in FIG. 3A. The inventors have noticed that, when the slurry blocking plate 7 formed by a single plate as shown in FIGS. 1 and 2 is brought into contact with the work W, the slurry blocking plate 7 is sometimes in contact with the work W in a slanted manner mistakenly, whereby the surface of the slurry blocking plate 7 contacting the work W is misaligned from the predetermined position. In a case where the surface of the slurry blocking plate 7 contacting the work W is misaligned from the predetermined position, relatively large clearance is generated between the slurry blocking plate 7 and the work W and slurry splashes up to the top surface of the work W, possibly resulting in a situation where excess increase in nanotopography and Warp cannot be effectively suppressed. In contrast, in a case where the slurry blocking plate 7 is formed by plural plate pieces 700, if the slurry blocking plate 7 is brought into contact with the work W in a slanted manner by mistake, plural plate pieces 700 are in contact with the work W along a surface thereof, respectively, as shown in FIG. 3B, whereby clearance between the slurry blocking plate 7 and the work W is relatively small, as compared with the case of the slurry blocking plate 7 formed by a single plate, and adhesion between the work W and the slurry blocking plate 7 improves. As a result, splash of slurry onto the top surface of the work W is suppressed and excess increase in nanotopography and Warp can be effectively suppressed. Further, as an additional effect of employing the aforementioned structure where the slurry blocking plate 7 is constituted of plural plate pieces 700, for example, it suffices to replace only broken plate piece(s) 700 with new one(s) if the slurry blocking plate 7 suffers from breakage. Accordingly, repair cost can be saved, as compared with the case where the slurry blocking plate 7 formed by a single plate is broken.

In the structure described above, the surface 15 facing the path along which the work is pushed into the wires, of the slurry blocking plate 7, is preferably provided with an elastic member 16, as shown in FIG. 3C. In a case where the elastic member 16 is provided on the surface 15 facing the path along which the work is pushed into the wires, of the slurry blocking plate 7, if the slurry blocking plate 7 is brought into contact with the work W in a slanted manner and clearance is generated therebetween, the elastic member 16 exists between the work W and the slurry blocking plate 7, buries the clearance and further improves adhesion between the work W and the slurry blocking plate 7, as shown in FIG. 3C, whereby splash of slurry onto the top surface of the work W is effectively suppressed.

The foregoing descriptions merely explain a part of an embodiment of the present invention, and the aforementioned structures may be combined with each other and/or various modifications may be added thereto within the spirit of the present invention.

EXAMPLES

Next, a wafer obtained by cutting an ingot by using a wire saw device of the present invention and a wafer obtained by cutting an ingot by using a conventional wire saw device lacking a slurry blocking plate are evaluated regarding nanotopography and Warp thereof, respectively.

(Production Condition)

Cutting of an ingot is carried out by using a wire saw device of the present invention as shown in FIG. 1 and a conventional wire saw device lacking a slurry blocking plate, respectively, under the cutting conditions shown in Table 1 below. The ingot for use in the cutting operation is a silicon ingot having diameter of 300 mm, and wafers each having thickness of approximately 0.7 to 1.0 mm are cut out therefrom.

Figure 4:
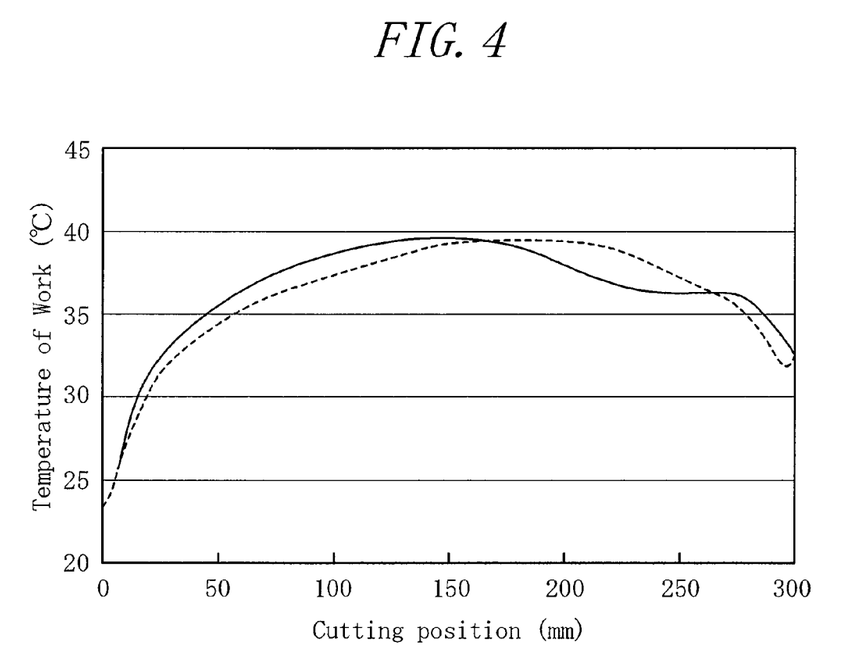
FIG. 4 is a view showing change in temperature of an ingot.

FIG. 4 is a view showing change in temperature of an ingot measured by a radiation thermometer when the ingot is cut by using a wire saw device of the present invention and change in temperature of an ingot measured by a radiation thermometer when the ingot is cut by using a conventional wire saw device lacking a slurry blocking plate. The dotted line in FIG. 4 represents change in temperature of an ingot when the conventional wire saw device is used, while the solid line represents change in temperature of an ingot when the wire saw device of the present invention is used. From these results, it is understood that change in temperature of an ingot when the wire saw device of the present invention is used is moderate, as compared with change in temperature of an ingot when the conventional wire saw device is used.

Figure 5:
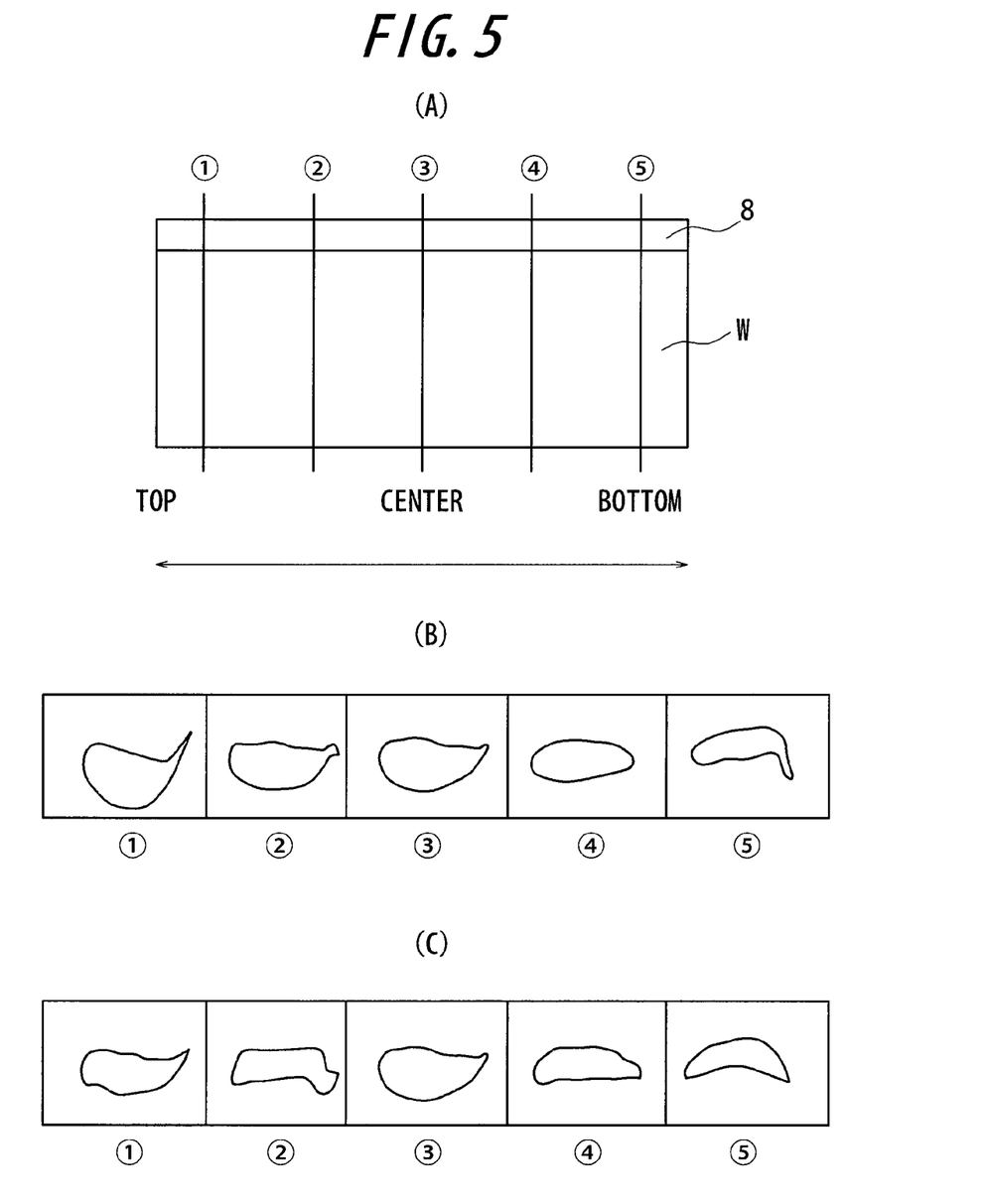
FIG. 5A is a view showing an ingot before being cut and typical cutting positions thereon.
FIG. 5B is a view showing surface configurations of a wafer when the wafer is cut by using a conventional wire saw device.
FIG. 5C is a view showing surface configurations of a wafer when the wafer is cut by using the wire saw device of the present invention.

Further, FIG. 5A is a view showing an ingot before being cut and typical cutting positions thereon. FIG. 5B is a view plotting surface configurations of a wafer when the wafer is cut by using a conventional wire saw device. FIG. 5C is a view plotting surface configurations of a wafer when the wafer is cut by using the wire saw device of the present invention. The terms "Top", "Center" and "Bottom" represent the order of pulling up an ingot, respectively, and "Top" represents a region of an ingot, which region is pulled up at first. As is obvious from the surface configurations of the wafers shown in FIGS. 5B and 5C, a wafer having relatively less wavy surface configurations can be obtained across the entire regions from the "Top" side to the "Bottom" side of an ingot by using a wire saw device of the present invention, as compared with the case using the conventional wire saw device. Following measurements are carried out as specific evaluations.

TABLE 1

|  |  | Cutting condition |
|---|---|---|
| Work | Ingot diameter | 300 mm |
| Wire | Wire diameter | 0.11-0.18 mm or so |
|  | Wire tension | 20-30 N or so |
|  | Wire running speed | Average speed: 400-900 m/min |
| Slurry | Grain particles | Average grain particle: 5-15 μm |
|  | Supply rate of slurry | 50-150 kg/min |
|  | Temperature of slurry | 18.0-26.0° C. |

(Nanotopography)

Figure 6:
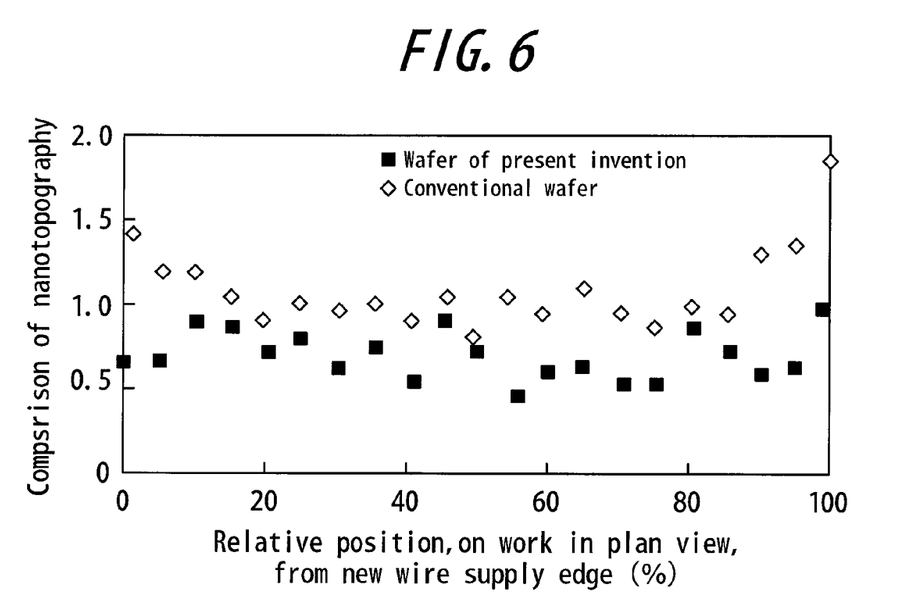
FIG. 6 is a view showing a measurement result of nanotopography.

Each of the wafers obtained by the processes as described above is evaluated for nanotopography in terms of "Peak Valley" (which may be referred to as "PV" hereinafter) as an index indicating magnitude of minute irregularities in a spatial wavelength region of 0.2 to a few dozen mm on a wafer surface by using "Nanomapper" manufactured by KLA Tencor Co. Ltd,. The result is shown in FIG. 6. The Y-axis of the graph plots respective quotients obtained when respective results of the conventional wafer are divided by the average value of the nanotopography PV measurement of all wafers resulting from a work used as the data of the conventional wafer and respective quotients obtained when respective results of the wafer of the present invention are divided by the same average value as explained above. That is, The Y-axis of FIG. 6 represents how much the respective results of the conventional wafer and the respective results of the wafer of the present invention have been each improved relative to the average value of the conventional wafer which is expressed as 1. Further, the X-axis of FIG. 6 graph represents the relative position, on a work in a plan view, of the new wire supply edge (see ① of FIG. 5A) from itself (the new wire supply edge), which position is expressed as 0%, the relative position, on a work in a plan view, of the wire discharge edge (see ⑤ of FIG. 5A) from the new wire supply edge, which position is expressed as 100%, and other positions differing by approximately 5% from each other between these two positions. A pair of quotients is plotted at each relative position. As is obvious from FIG. 6, increase in nanotopography is significantly suppressed in the wafer according to the present invention obtained by using the wire saw device of the present invention, as compared with the conventional wafer obtained by using the conventional wire saw device lacking a slurry blocking plate. More specifically, increase in nanotopography is suppressed at the Center side of the respective ingots in both the conventional wafer and the wafer obtained according to the present invention. In contrast, regarding the Top side and the Bottom side of the ingots, increase in nanotopography is effectively suppressed in the wafer according to the present invention, while increase in nanotopography is not effectively suppressed in the conventional wafer.

(Warp)

Figure 7:
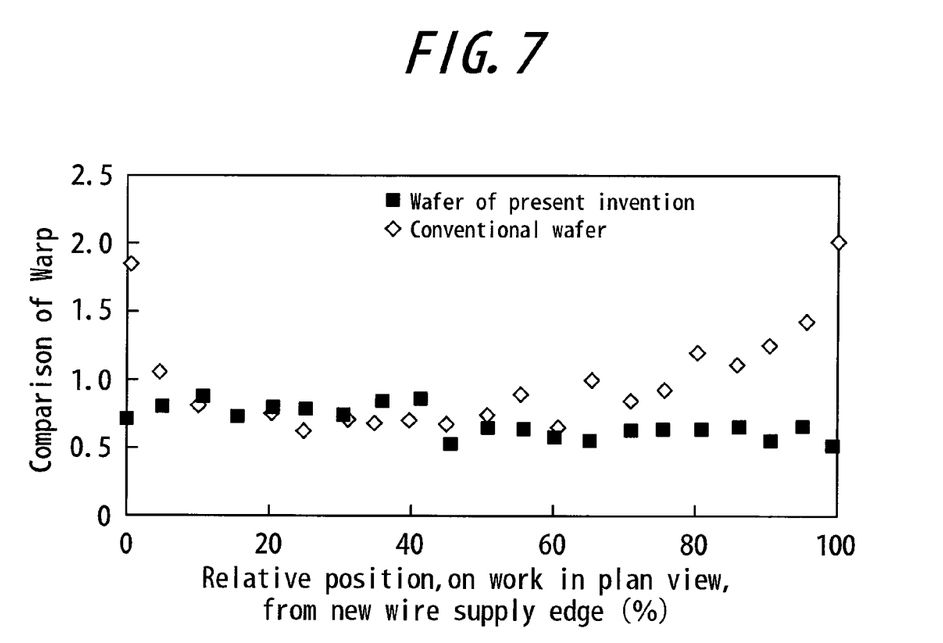
FIG. 7 is a view showing a measurement result of Warp.

Further, each of the wafers obtained by the processes as described above is evaluated for Warp by using "Wafersight" manufactured by KLA Tencor Co. Ltd,. The result is shown in FIG. 7. "Warp" regarding the wafer configuration in the present Example represents a value obtained by: calculating a "BestFit" face as the reference face, on the center face in thickness direction, by the least squares method; calculating the maximum displacement of the recessed side from the reference face and the maximum displacement of the protruding side from the reference face; and summing up the two maximum displacements. The Y-axis of the graph plots, as in the case of nanotopography, respective quotients obtained when respective result data of each wafer are divided by the average value of the conventional wafer, which quotients indicate how much the respective results of each wafer have been improved relative to the average value of the conventional wafer. Further, regarding the X-axis of FIG. 7 graph represents, as in the case of nanotopography, the relative position, on a work in a plan view, of the new wire supply edge from itself (the new wire supply edge) expressed as 0%, the relative position, on a work in a plan view, of the wire discharge edge from the new wire supply edge expressed as 100%, and other positions differing by approximately 5% from each other between these two positions. As is obvious from the results of FIG. 7, increase in Warp is significantly suppressed in the wafer according to the present invention (indicated by the black squares) obtained by using the wire saw device of the present invention, as compared with the conventional wafer (indicated by the white squares) obtained by using the conventional wire saw device lacking a slurry blocking plate. More specifically, increase in Warp is suppressed at the Center side of the respective ingots in both the conventional wafer and the wafer obtained according to the present invention. In contrast, regarding the Top side and the Bottom side of the ingots, increase in Warp is effectively suppressed in the wafer according to the present invention, while increase in Warp is not effectively suppressed in the conventional wafer.

As is obvious from the descriptions above, according to the present invention, it is possible to provide a wire saw device capable of effectively preventing slurry from splashing onto the top surface of a work and effectively suppressing increase in nanotopography and Warp. Further, since such a wire saw device as described above has a relatively simple device structure, it is possible to provide the device at a relatively cheap price.

What is claimed is:

1. A wire saw device comprising:
   a group of multiple wires suspended in parallel to one another in a cutting side thereof, over plural rollers disposed separate from each other, so as to be capable of running in a direction orthogonal to the roller shaft direction;
   a work holding portion for holding a work and capable of moving in a direction of pushing the work with respect to the multiple wires;
   a nozzle for supplying slurry to the group of multiple wires from at least a position on the upperstream side in the running direction of the multiple wires, with respect to a path along which the work is pushed into the wires; and
   a slurry blocking plate, extending in the direction along which the multiple wires are aligned in parallel to one another, and pivotably fixed at a base point at least on the upperstream side in the running direction of the multiple wires with respect to the path and above the multiple wires, such that the slurry blocking plate falls, around the base point, on the work in the direction of pushing the work with respect to the multiple wires.

2. The wire saw device of claim 1, wherein the slurry blocking plate can be biased toward the path along which the work is pushed into the wires.

3. The wire saw device of claim 1, further comprising:
   another nozzle for supplying slurry to the group of multiple wires provided on the downstream side in the running direction of the multiple wires with respect to an operation region where the work is pushed into the wires; and another slurry blocking plate pivotably fixed at a base point above the multiple wires and said another nozzle such that said another slurry blocking plate falls, around the base point, on the work in the direction of pushing the work with respect to the multiple wires.

4. The wire saw device of claim 1, wherein the length in the roller shaft direction of the slurry blocking plate is equal to or larger than the length in the roller shaft direction of the group of the multiple wires.

5. The wire saw device of claim 1, wherein the slurry blocking plate is formed by a flexible material.

6. The wire saw device of claim 5 above, wherein the flexible material is selected from the group consisting of resin, metal, rubber and combination thereof.

7. The wire saw device of claim 1, wherein the slurry blocking plate is constituted of plural plate pieces juxtaposed in the roller shaft direction.

8. The wire saw device of claim 1, wherein an elastic member is provided on a surface of the slurry blocking plate facing the path along which the work is pushed into the wires.

9. The wire saw device of claim 1, wherein the base point is separate from and above the corresponding nozzle for supplying slurry.

* * * * *